United States Patent
Kakinada et al.

(10) Patent No.: US 11,606,743 B2
(45) Date of Patent: Mar. 14, 2023

(54) SERVICE ANNOUNCEMENTS IN WIRELESS COMMUNICATION SYSTEMS

(71) Applicant: Charter Communications Operating, LLC, St. Louis, MO (US)

(72) Inventors: Umamaheswar Kakinada, Centennial, CO (US); Curt Wong, Bellevue, WA (US); Yildirim Sahin, Englewood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/307,009

(22) Filed: May 4, 2021

(65) Prior Publication Data

US 2022/0361092 A1    Nov. 10, 2022

(51) Int. Cl.
*H04W 48/16*  (2009.01)
*H04W 72/00*  (2009.01)
*H04W 48/10*  (2009.01)
*H04L 41/0806*  (2022.01)

(52) U.S. Cl.
CPC ......... *H04W 48/16* (2013.01); *H04L 41/0806* (2013.01); *H04W 48/10* (2013.01); *H04W 72/005* (2013.01)

(58) Field of Classification Search
CPC ... H04W 48/16; H04W 48/10; H04W 72/005; H04L 41/0806
See application file for complete search history.

(56) References Cited

U.S. PATENT DOCUMENTS

| | | | |
|---|---|---|---|
| 2014/0047255 A1* | 2/2014 | Sasaki | H04L 12/40 713/323 |
| 2021/0058784 A1 | 2/2021 | Kedalugudde et al. | |
| 2021/0153108 A1* | 5/2021 | Joseph | H04W 48/08 |

FOREIGN PATENT DOCUMENTS

WO    2021045573 A1    3/2021

OTHER PUBLICATIONS

3GPP, "TS 22.261—Service requirements for the 5G system." Technical Specification, Release 16, Version 16.13.0 (Sep. 2020): 1-69.

(Continued)

*Primary Examiner* — Diane D Mizrahi
(74) *Attorney, Agent, or Firm* — Mendelsohn Dunleavy, P.C.; Steve Mendelsohn

(57) ABSTRACT

A radio access network (RAN) for a wireless communication network transmits, to user equipment (UE), information about NPN services provided by a non-public network (NPN) supported by the wireless network, where the UE is not subscribed to the NPN. In some embodiments, the NPN service information is periodically broadcasted to the UE; in other embodiments, the information is transmitted in response to receiving a request from the UE. In response to receiving the NPN service information, the UE transmits and the RAN receives an on-boarding request from the UE to on-board the UE to the NPN, which the RAN forwards to an on-boarding network (OBN) of the wireless network. In response, the RAN receives NPN credentials for the UE from the OBN, which the RAN forwards to the UE, which uses the NPN credentials to register to the NPN, thereby enabling the non-subscribing UE to subscribe to the NPN.

27 Claims, 5 Drawing Sheets

(56) References Cited

OTHER PUBLICATIONS

3GPP, "TS 23.003—Numbering, addressing and identification." Technical Specification, Release 16, Version 16.4.0 (Sep. 2020): 1-141.
3GPP, "TS 23.122—Non-Access-Stratum (NAS) functions related to Mobile Station (MS) in idle mode." Technical Specification, Release 16, Version 16.7.0 (Sep. 2020): 1-83.
3GPP, "TS 23.501—System architecture for the 5G System (5GS)." Technical Specification, Release 16, Version 16.6.0 (Sep. 2020): 1-447.
3GPP, "TS 38.331—Radio Resource Control (RRC) protocol specification." Technical Specification, Release 16, Version 16.2.0 (Sep. 2020): 1-921.
International Search Report and Written Opinion for corresponding International application No. PCT/US2022/026498 dated Aug. 9, 2022 (10 pages).

\* cited by examiner

Option 1

- Each bit in NID value indicates the *offered local SNPN services category*
- *NID value is 10 hexadecimal digits*
- Allows broadcasting any combination of bits to indicate the offered services by a given SNPN

Option 2

- NID value is split into fields where the first portion may encode an *SNPN category* like coffee shop, concert hall, stadium, city, airport, etc., while the second portion can indicate the *offered SNPN services* SNPN categories could include airport, concert hall, stadium, city centre, etc.
- The offered services are specific to each category mentioned above, encoded in the next field
- A convention could be adopted in the standard for defining the categories and services specific to each category, *this may be tied to specific Assignment mode*
- Assignment Mode + Spare hexadecimal digits + SNPN category + Category-specific offered SNPN services

Option 3

- A new *Assignment mode* value, which is not currently in use, will be reserved for use in this solution option.
- It will be used for SNPN service advertisement for SNPN service providers with a *PEN*
- *NID code field* will be encoded such that the value will represent some standardized SNPN service offerings by that PEN. Hence, each PEN can define its own standardized SNPN service offering independently
- Assignment Mode + NID PEN + offered SNPN services by PEN holder

FIG. 5

SERVICE ANNOUNCEMENTS IN WIRELESS COMMUNICATION SYSTEMS

BACKGROUND

Field of the Disclosure

The present disclosure relates to wireless communications and, more specifically but not exclusively, to wireless communication systems that support non-public networks.

Description of the Related Art

This section introduces aspects that may help facilitate a better understanding of the disclosure. Accordingly, the statements of this section are to be read in this light and are not to be understood as admissions about what is prior art or what is not prior art.

The Third Generation Partnership Project Release-16 (3GPP Rel-16) standard for 5G wireless communication systems has introduced a Non-Public Network (NPN) feature that allows private network deployments. For example, a business, such as a coffee shop or bookstore, or a location, such as a sports arena, may deploy an NPN that provides particular services to users of wireless user equipment (UE) who are subscribers to their private network, which services are not available to non-subscribers. For example, a coffee shop may offer discounts to its subscribers that are not available to non-subscribers.

In 3GPP Rel-16, it is assumed that the subscription credentials to access an NPN, such as a Stand-alone Non-Public Network (SNPN), are pre-configured in the subscriber's UE. In other words, only the UEs that already have an SNPN subscription can access and make use of the services from that SNPN.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 5 represents three different possible options for encoding bits in the NID.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may be performed out of the order noted in the figures. For example, two figures shown in succession may in fact be executed substantially concurrently or may sometimes be executed in the reverse order, depending upon the functions/acts involved.

For Release-17, the 3GPP has been studying some enhancements to non-public networks like SNPNs, such as on-boarding to the SNPN of a UE of a user who does not have an SNPN subscription. The 3GPP Release-17 study does not cover the aspects of how the user can discover the services offered by a local SNPN for which the UE does not have any preconfigured subscription credentials. If the non-subscribing user can be made aware of the SNPN services offered in a service area (in this context, service area is the area where the user is currently located), then the user can better decide whether to initiate the on-boarding process to the SNPN to make use of the SNPN services.

According to certain embodiments of the disclosure, a private network, such as a 5G NPN network, supports wireless communications with UEs, such as cell phones and the like, of non-subscribers that inform the non-subscribers of those services that are supported for subscribers so that those non-subscribers can decide whether to subscribe to the private network. Depending on the particular implementation, the base station of a private network may employ one or both of two different modes for such communications. In a first communication mode, the NPN base station broadcasts information about its subscription services to any UE able to receive those downlink messages. In the second mode, a UE transmits an uplink request for such information, and the NPN base station responds by transmitting the information in a unicast downlink message back to the UE.

Figure 1:
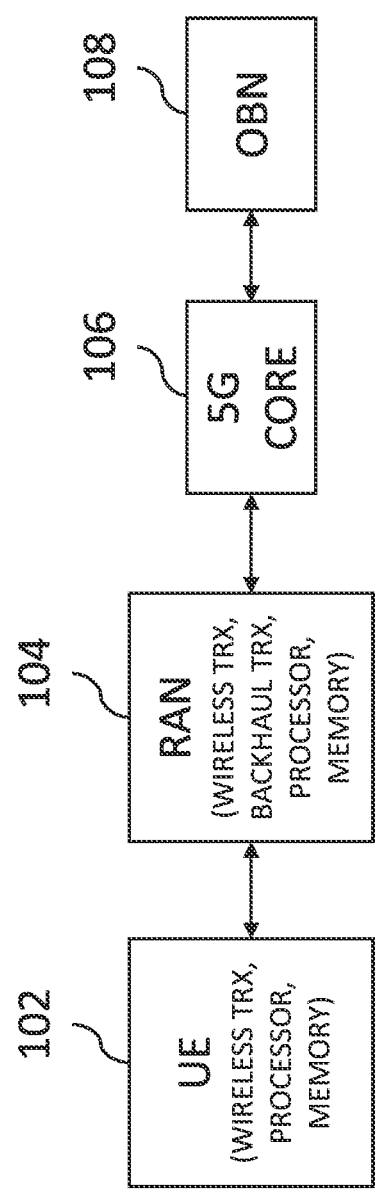
FIG. 1 is a simplified block diagram of a wireless 5G communications network, according to certain embodiments of the disclosure.

FIG. 1 is a simplified block diagram of a wireless 5G communications network 100, according to certain embodiments of the disclosure. 5G network 100 has one or more 5G cores (5GCs) 106, only one of which is shown in FIG. 1, that support the operations of one or more radio access networks (RANs) 104, only one of which is shown in FIG. 1. Each RAN 104 has one or more base stations (gNBs) (not shown in FIG. 1), each of which can communicate with one or more UEs 102, only one of which is shown in FIG. 1. The operations supported by the 5GCs 106 may include one or more SNPNs (as well as one or more Public Land Mobile Networks (PLMNs)) that may use the RANs 104 to communicate with the UEs 102.

Also shown connected to the 5GC 106 of FIG. 1 is an On-Boarding Network (OBN) 108, which enables the on-boarding of new SNPN subscriptions to UEs 102 and is described in further detail below.

As shown in FIG. 1, the UE 102 includes a wireless transceiver (TRX) for communicating with the RAN 104, a processor for controlling the operations of the transceiver and processing incoming and outgoing data, and a memory for storing data and, in some implementations, software for controlling the operations of the processor. Similarly, the RAN 104 includes a wireless transceiver for communicating with the UE 102, a backhaul transceiver for communicating with the 5G core 106 (including the OBN 108), a processor for controlling the operations of the transceivers and processing incoming and outgoing data, and a memory for storing data and, in some implementations, software for controlling the operations of the processor.

Certain embodiments of the present disclosure enable a UE 102 to discover a new NPN, learn its service capabilities, and register and connect with it. While connected to a given NPN, the UE 102 can learn about and take advantage of additional services that may be available in the currently connected NPN. The UE 102 can request service information about different available NPNs at regular intervals. While connected to a given NPN, the UE 102 can discover and connect with a different NPN to avail itself of better or more-desirable services.

First Communication Mode: Broadcasted SNPN Information

The following describes some possible solutions to how a gNB of an SNPN can advertise/broadcast offered SNPN services to visiting UEs that do not already have valid SNPN credentials to access the SNPN.

As per 3GPP Rel-16 specifications, SNPN Identifiers (SNPN-IDs) are broadcasted by gNBs. A 3GPP Rel-16 compliant UE, which is in the service area of a gNB and has subscription and pre-configured credentials for one of the SNPN-IDs broadcasted by the gNB, may select that SNPN-ID by following the automatic or manual SNPN selection procedures specified in 3GPP TS 23.122 Rel-16, and then initiate the SNPN registration procedure as per 3GPP TS 23.501, the teachings of both of which are incorporated herein by reference in their entirety. If the UE does not have valid SNPN credentials to access any of the SNPN-IDs broadcasted by the gNB, then the UE cannot access any of the SNPNs in the gNB service area.

As described above, the 3GPP has not specified or studied any method on how an SNPN could advertise/broadcast the services offered in an SNPN service area for a UE that has no prior relationship or subscription. A user of a UE who visits the SNPN service area and does not have a subscription to the SNPN (and any associated SNPN credentials pre-configured in the UE), may be interested in using the SNPN services based on broadcasted service information in order to make a more-informed decision whether to initiate the SNPN on-boarding process to make use of the SNPN services.

As described further below, the proposed solutions enhance the encoding/structure of the Network Identifier (MD) portion of the SNPN-ID contained in broadcasted downlink messages, so that a gNB can advertise/broadcast services offered by the SNPN, and a UE that does not already have any valid SNPN credentials in the gNB's coverage area, may initiate an SNPN on-boarding procedure by the OBN 108 of FIG. 1. An SNPN on-boarding procedure is a way to download the SNPN credentials to the UE. Once the on-boarding procedure is successfully completed, the UE can then perform an SNPN registration procedure using the downloaded SNPN credentials to make use of the SNPN services.

Figure 2:
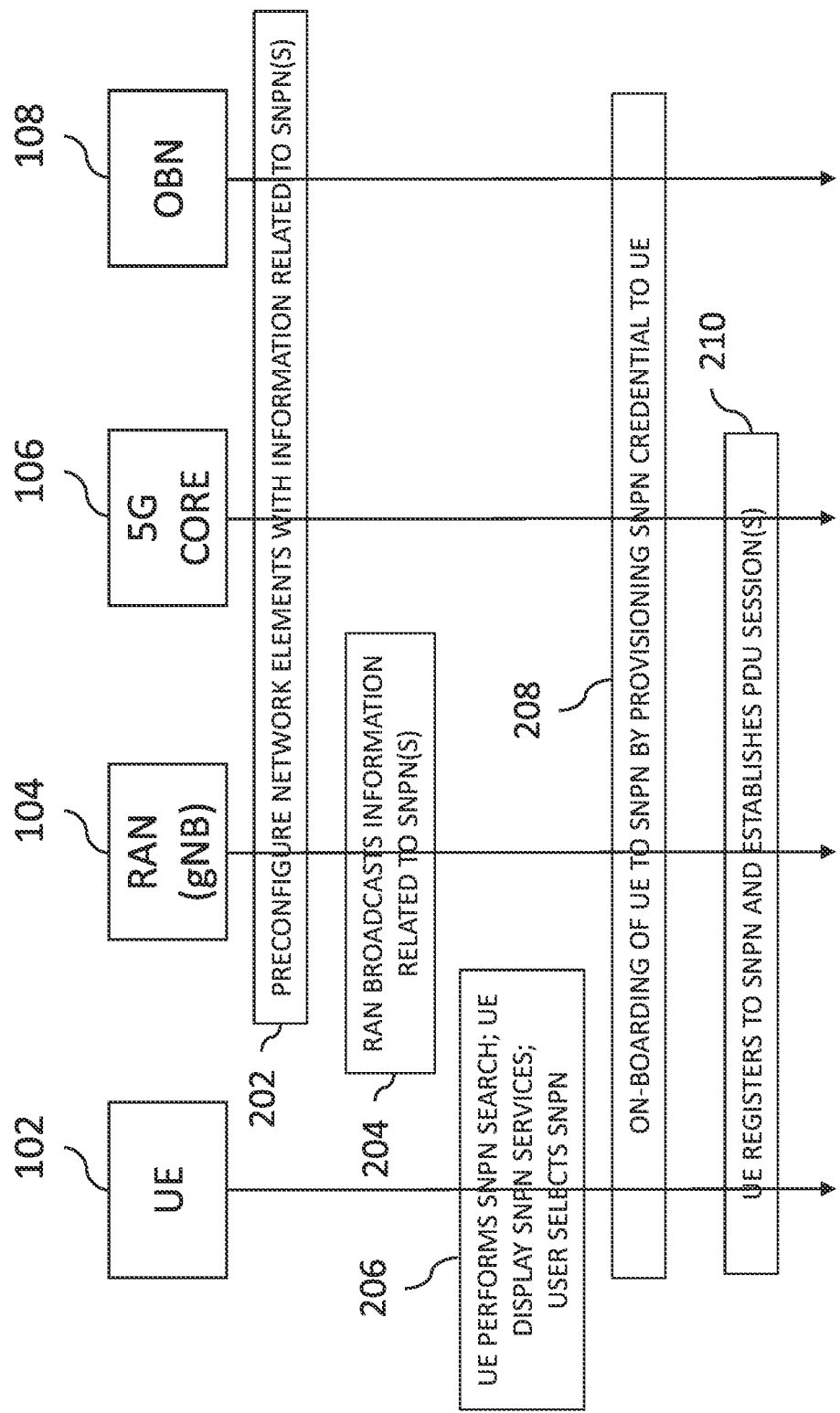
FIG. 2 is a signal flow diagram representing the flow of signals in the communications network of FIG. 1 according to certain embodiments of the disclosure that perform the first NPN communication mode.

FIG. 2 is a signal flow diagram representing the flow of signals in the communications network 100 of FIG. 1 according to certain embodiments of the disclosure that perform the first NPN communication mode. The process begins at step 202 with the pre-configuration of the RAN 104, the 5GC 106, and the OBN 108 with information related to one or more SNPNs supported by the communications network 100.

At step 204, the RAN 104 then uses its gNBs to broadcast information related to those SNPN(s). Note that, in some situations, an SNPN will be associated with one or more gNBs whose service area(s) correspond to the location of the enterprise that sponsors the SNPN. In those situations, only those gNB(s) might broadcast information about that SNPN. In some situations, a given gNB may be associated with more than one SNPN and/or possibly one or more PLMNs. In those situations, the gNB may sequentially broadcast information about the different SNPN(s) and/or PLMN(s), whose identifies are listed in the same broadcasted System Information Block (SIB) (i.e., SIB-1).

According to 5G Rel-15, a PLMN is identified with an (PLMN Identifier (PLMN-ID), while an SNPN is identified with an SNPN Identifier (SNPN-ID) that consists of a PLMN-ID and a Network Identifier (NID), where the RAN 104 broadcasts the PLMN-ID(s) and/or the SNPN-ID(s) of the 5G core(s) 106 to which the RAN 104 is connected. The broadcast of such PLMN-IDs and SNPN-IDs along with any other system information is specified in 3GPP Technical Specification (TS) 38.331.

Figure 3:
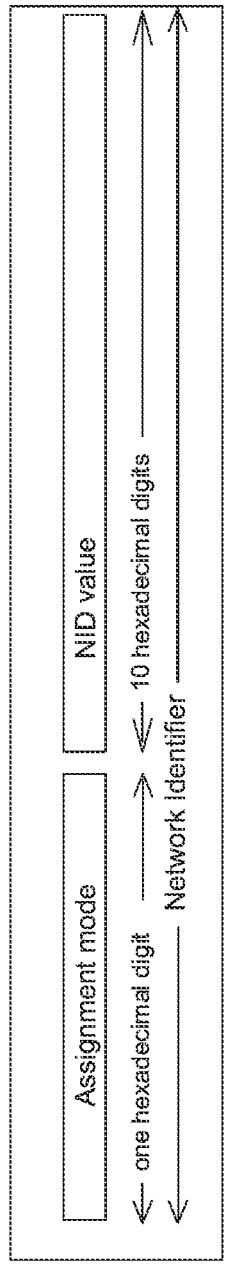
FIG. 3 is a diagram representing the format of the Network Identifier (NID), according to the 3GPP Rel-16.

As shown in FIG. 3, according to the 3GPP Rel-15, the NID for an SNPN has 44 bits: a 4-bit Assignment Mode value (corresponding to one hexadecimal (aka hex) digit) followed by a 40-bit NID value (corresponding to 10 hex digits). The 3GPP Rel-16 defines Assignment Mode values of (decimal) 0, 1, and 2, reserving the 13 other possible Assignment Mode values (i.e., decimal values 3 to 15) available for future definition.

In particular, according to 3GPP TS 23.003 Rel-16, the teachings of which are incorporated herein by reference in their entirety, a 4-bit NID Assignment Mode value of 0 implies that the 40-bit NID value is globally unique independent of the corresponding PLMN-ID. A NID Assignment Mode value of 1 implies that the MD value is chosen individually by the SNPN at deployment time. A MD Assignment Mode value of 2 implies that the MD value is assigned such that the combination of the MD value and the corresponding PLMN-ID is globally unique. The assignment model for a NID Assignment Mode value of 1 is referred to as self-assignment, while the two other assignments models are referred to as coordinated assignment.

Figure 4:
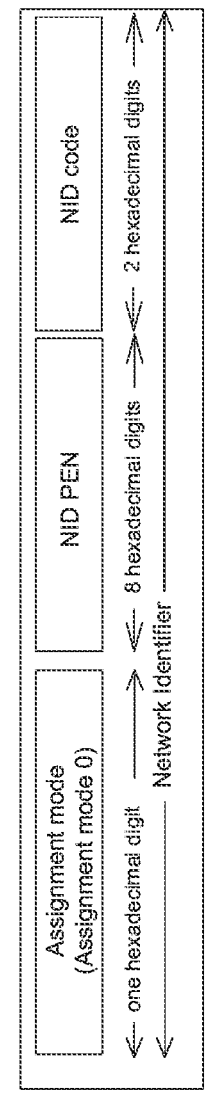
FIG. 4 is a diagram representing the format of the NID for the NID Assignment Mode value of 0, according to the 3GPP Rel-16.

As shown in FIG. 4, for the NID Assignment Mode value of 0, the 40-bit MD value is further divided into an eight-digit NID Private Enterprise Number (PEN) followed by a two-digit NID Code, where the NID PEN is issued to the service provider of the SNPN by the Internet Assigned Numbers Authority (IANA) in its capacity as the private enterprise number administrator, and the NID Code identifies the SNPN within the service provider identified by the NID PEN.

According to certain embodiments, a new 4-bit NID Assignment Mode value is defined to be one of the reserved decimal values 3-15. The 40-bit NID value is then used to provide information about the services provided by the SNPN identified by the corresponding SNPN-ID.

As shown in Option 1 of FIG. 5, in one possible implementation, one or more of the ten hex digits of the 40-bit NID value are used to represent different types of services provided by the SNPN. For example, the bits in the last two hex digits could be used to represent the following services:

0000 0001 Low-speed public internet access
0000 0010 High-speed public internet access
0000 0100 Drink services
0000 1000 Food services
0001 0000 Videos from different angles
0010 0000 Local promotions/sales
0100 0000 Emergency assistance If the previously reserved Assignment Mode value 4 is used for SNPN services and a particular SNPN provides high-speed public internet access, drink services, and local promotions/sales, then the 44-bit NID value would be:

0100 0000 0000 0000 0000 0000 0000 0000 0000 0010 0110 where the first 4-bit value 0100 represents the Assignment Mode value 4 and the three 1s in the last two values 0010 0110 identify the three supported services. In hex format, the 11-digit NID value would be 40000000026.

As shown in Option 2 of FIG. 5, in another possible implementation, the 10-digit NID value is divided into different portions, where a first portion (e.g., one hex digit) identifies the SNPN category, while a second portion (e.g., another two hex digits) identify the offered SNPN services (as in the previous example), where any remaining portion (e.g., the remaining seven hex digits) are reserved. For example, the eighth hex digit could be used to identify the SNPN category as follow:

0001 Coffee shop
0010 Concert hall
0011 Stadium
0100 Restaurant
0101 Bookstore
0110 City
0111 Airport If the previously reserved Assignment Mode value 4 is used for SNPN services, and a restaurant having an SNPN provides high-speed internet access, drink and food services, and local promotions/sales, then the 44-bit NID value would be:

0100 0000 0000 0000 0000 0000 0000 0000 0100 0010 1110 where the first 4-bit value 0100 represents the Assignment Mode value 4, the eighth 4-bit value 0100 identifies the enterprise as a restaurant, and the four 1s in the last two 4-bit values 0010 1110 identify the four supported services. In hex format, the 11-digit NID value would be 4000000042E, where the hex value E corresponds to the decimal value 14.

As shown in Option 3 of FIG. 5, in yet another possible implementation, a different Assignment Mode value (e.g., 5) could be used to enable different SNPNs to define different standardized service offerings uniquely. In this option, the UE downloads a configuration file for mapping the SNPN service configuration offered by different PENs. This configuration information may be preconfigured in the UE or downloaded from a trusted source by the UE.

Certain embodiments of this disclosure are enhancements of NID assignment mode 0, in which NID value include a 32-bit globally unique PEN (Private Enterprise Number) and an 8-bit NID code. The disclosure proposes a method to advertise/broadcast service offerings for SNPN operators who have PEN assignments. For example, a stadium operator gets a PEN assigned by the Internet Assigned Numbers Authority (IANA) (www.iana.org/assignments/enterprise-numbers/enterprise-numbers). Then, as per sample encoding, the operator uses this PEN constructing the SNPN-ID. The 8-bit NID code value is used to broadcast type of services offered in this stadium by the stadium operator. A user who visits the stadium for an event, like a game or concert, can download a file (e.g., from a website established by PEN holder(s)) that has all possible SNPN service offerings by the different PEN holders. Such a file can allow end-users to map the specific SNPN services broadcasted at this stadium location by 8-bit NID code to a human readable format. Such mapping can also be automated by some other means such as an application downloaded in the UE.

Referring again to FIG. 2, at step 206, a UE 102 that receives the broadcasted SNPN information, performs an SNPN search, e.g., as manually selected by the user, and displays information about the services provided by the one or more available SNPN(s) to which UE is not already subscribed. If and when the user selects one of the available SNPNs, a process of on-boarding the UE to the SNPN is performed at step 208 during which the SNPN credential is provisioned to the UE.

For example, in a coffee shop has an SNPN that offers free internet service or any promotional sales for their customers, the SNPN network can broadcast this service offering via a gNB for its service area. The user of a UE can initiate a manual SNPN network search in the coffee shop to discover available networks and services. The UE displays an SNPN-ID and associated offerings (e.g., free internet service) to the user. If the user is interested in the service, then the user can select the associated SNPN to start an on-boarding process.

As another example, a stadium venue has an SNPN that offers various services for customers visiting the venue. The services offered are, for example, free best-effort internet, paid high-speed internet, special event videos from different camera angles, etc. These service offerings are broadcasted via a gNB by associating one or more of these services with one or more SNPN-IDs. The user of the UE can initiate a manual SNPN network search in the venue to discover available networks and services. The UE displays the SNPN-ID(s) and associated service offerings to the user. If the user is interested in utilizing any of the services, then the user can select the associated SNPN to start an on-boarding process.

During the on-boarding procedure, the UE may receive a new SNPN-ID from the 5GC to be used for accessing SNPN service. This new SNPN-ID is also broadcast by the same gNB. The on-boarding process will be based on the 3GPP Rel-17 feature. An example of an on-boarding procedure for the communications network 100 of FIG. 1 can be summarized as:

A UE 102 without valid SNPN credentials asks the 5GC 106 to provide such credentials via UE-to-5GC signaling through the RAN 104;

The 5GC 106 retrieves temporary SNPN credentials for this UE 102 from the OBN 108, which then assigns for the UE 102 permanent SNPN credentials, which may include a new SNPN-ID to be used by the UE 102 for SNPN local services:

The 5GC 106 sends the SNPN credentials back to the UE 102 via 5GC-to-UE signaling; and The UE detaches and then reattaches to the 5GC 106 using the downloaded SNPN credentials.

After the on-boarding procedure has been completed, in step 210, the UE 102 registers to the SNPN, thereby enabling the UE to establish PDU (Protocol Data Unit) sessions via the SNPN. This is for establishment of connection between UE and SNPN for data transfer. A PDU Session means association between the UE and a data network that provides accessing the services (e.g., internet) offered by an SNPN.

Second Communication Mode: Requested NPN Information (Applicable to all Flavors of NPN, SNPN as Well as PNI-NPN)

The following describes some possible solutions to how a UE that does not already have valid NPN credentials, can request information about the features of an available NPN. These solutions apply both to SNPNs as well as to Public Network Integrated NPNs (PNI-NPNs), which are defined in 3GPP TS 22.261 and 3GPP TS 23.501, the teachings of both of which are incorporated herein by reference in their entirety.

According to certain implementations, using new queries in existing 3GPP messages, a UE sends a request to the network soliciting information about NPN services offered, and the network responds with information about supported and available NPN service offerings. The UE then prompts the user with the available NPN service offerings and, with the user's consent, avails these services. The UE may also be pre-configured to avail these network connections and services, when available at a given location or from a certain provider.

Figure 6:
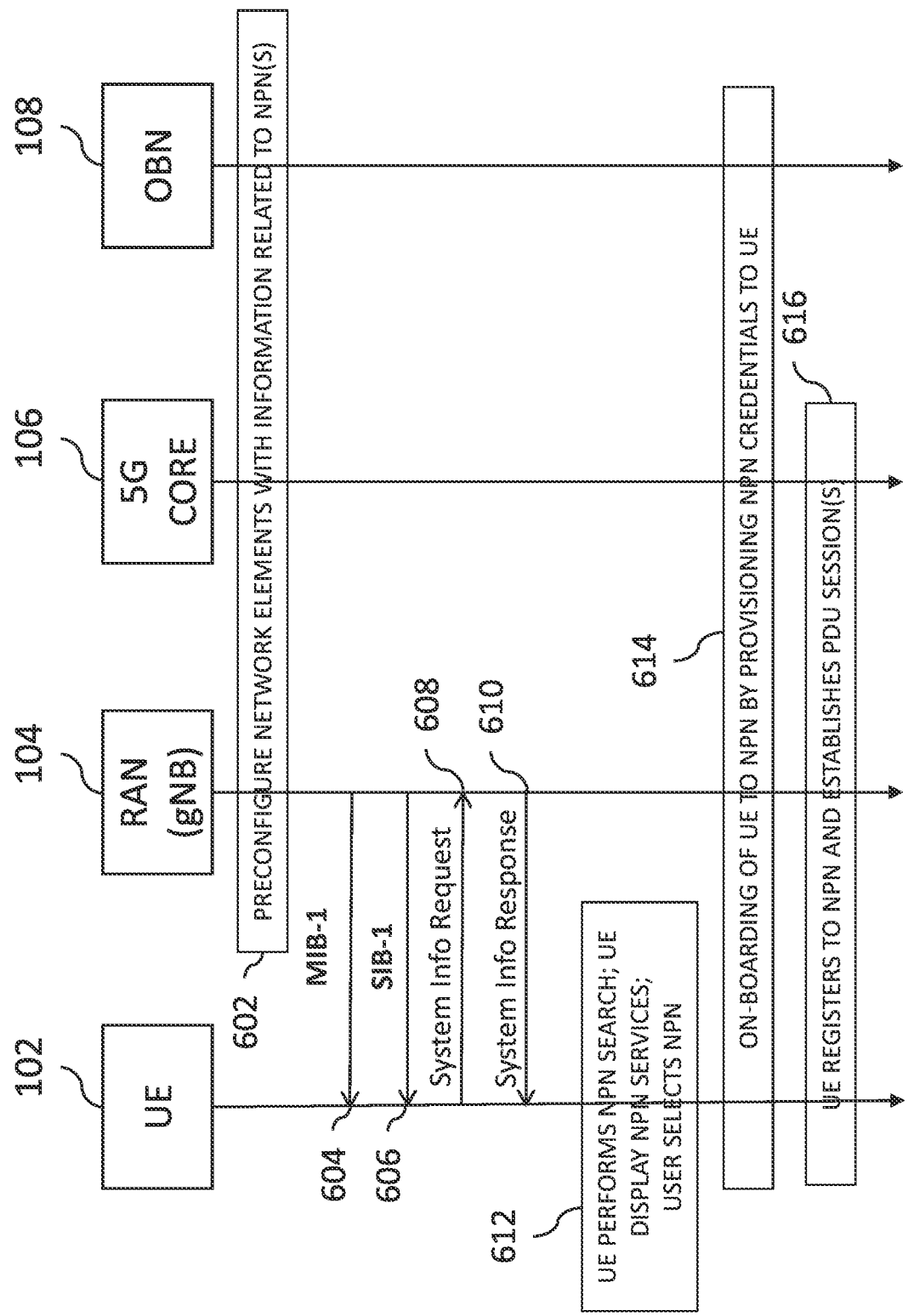
FIG. 6 is a signal flow diagram representing the flow of signals in the communications network of FIG. 1 according to certain embodiments of the disclosure that perform the second NPN communication mode.

FIG. 6 is a signal flow diagram representing the flow of signals in the communications network 100 of FIG. 1 according to certain embodiments of the disclosure that perform the second NPN communication mode. The process begins at step 602 with the pre-configuration of the RAN 104, the 5GC 106, and the OBN 108 with information related to one or more NPNs supported by the communications network 100. Step 602 is analogous to step 202 of FIG. 2.

In step 604, the RAN 104 broadcasts a downlink MIB (Master Information Block) message to the UEs 102. A MIB is a broadcast message sent on the radio network at regular intervals, which includes parameters that are needed for the UE to acquire a SIB-1 message from the cell. A MIB enables the UE to identify an amenable network and get associated with it.

In step 606, the RAN 104 broadcasts a downlink SIB-1 system information block message to the UEs 102. The SIB-1 message defines the other SIB messages (SIB-2, SIB-3, etc.) including the scheduling of the transmission of those other SIB messages. There are multiple SIBs (e.g., SIB-1 to SIB-14 and SIBpos) specified in 3GPP TS 38.331. Each SIB contains specific information. SIB-1 means System Information Block Type 1. SIB-1 is a special SIB which is sent periodically and it may also indicate the schedule of other SIB messages. If a given SIB message is not scheduled to be broadcast, then the UE may specifically request for the desired SIB message.

In step 608, in order to acquire information about NPN services, a particular UE 102 transmits an uplink system information request message to the RAN 104, and in step 610, the RAN 104 responds by broadcasting the requested system information in a downlink response message. Although not explicitly shown in FIG. 6, additional uplink request and corresponding downlink response messages may be transmitted as necessary until the UE 102 receives all of the needed information. Furthermore, because the downlink response messages are broadcasted, all of the UEs in the NPN's service area may also acquire that same information. Furthermore, because the downlink response messages are broadcasted, all of the UEs in the NPN's service area may also acquire that same information. These request and response messages are described in further detail below. The first exchange of information regarding NPN services is initiated by the UE 102 using a System Info Request message. Although not explicitly shown in FIG. 6, to minimize the load on the network because of similar requests from different UEs (e.g., in a stadium use case), the network may be configured to broadcast these SIB messages through the gNBs in a given area at regular intervals.

After the UE 102 has acquired all of the needed information, the UE 102 performs an NPN search (if appropriate), displays NPN service information, receives the user's NPN selection, initiates the on-boarding of the selected NPN, and registers to the NPN for PDU sessions in steps 612-616, which are analogous to steps 206-210 of FIG. 2. For step 612, as in step 206 of FIG. 2, the UE 102 may present the received information to the user in a user-friendly manner (if necessary, by decoding messages and bit strings), present different options to the user, and secure the user's preference/consent to join a chosen NPN.

3GPP TS 38.331, the teachings of which are incorporated herein by reference in their entirety, defines the SIB-1 downlink message SystemInformation as follows:

```
SystemInformation ::=            SEQUENCE {
    criticalExtensions           CHOICE {
       systemInformation            SystemInformation-IEs,
       criticalExtensionsFuture-r16  CHOICE {
          posSystemInformation-r16     PosSystemInformation-r16-IEs,
          criticalExtensionsFuture     SEQUENCE { }
       }
    }
}
SystemInformation-IEs ::=        SEQUENCE {
    sib-TypeAndInfo SEQUENCE (SIZE (1..maxSIB)) OF CHOICE {
       sib2                         SIB2,
       sib3                         SIB3,
       sib4                         SIB4,
       sib5                         SIB5,
       sib6                         SIB6,
       sib7                         SIB7,
       sib8                         SIB8,
       sib9                         SIB9,
       ...,
       sib10-v1610                  SIB10-r16,
       sib11-v1610                  SIB11-r16,
       sib12-v1610                  SIB12-r16,
       sib13-v1610                  SIB13-r16,
       sib14-v1610                  SIB14-r16
    },
    lateNonCriticalExtension     OCTET STRING    OPTIONAL,
    nonCriticalExtension         SEQUENCE { }    OPTIONAL
}
```

3GPP TS 38.331, the teachings of which are incorporated herein by reference in their entirety, defines the SIB-10 downlink message SIB10-r16 as follows:

```
SIB10-r16 ::=      SEQUENCE {
    hrnn-List-r16       HRNN-List-r16       OPTIONAL, -- Need R
    lateNonCriticalExtension   OCTET STRING       OPTIONAL,
    ...
}
```

```
HRNN-List-r16 ::=        SEQUENCE (SIZE (1..maxNPN-r16)) OF HRNN-r16
HRNN-r16 ::=             SEQUENCE {
   hrnn-r16 OCTET STRING (SIZE(1.. maxHRNN-Len-r16)) OPTIONAL -- Need R
}
```

3GPP TS 38.331 section 6.2.2, the teachings of which are incorporated herein by reference in their entirety, defines the uplink system information request message RRCSystemInfoRequest as follows:

```
RRCSystemInfoRequest ::=           SEQUENCE {
   criticalExtensions              CHOICE {
      rrcSystemInfoRequest                   RRCSystemInfoRequest-IEs,
      criticalExtensionsFuture-r16  CHOICE {
         rrcPosSystemInfoRequest-r16   RRC-PosSystemInfoRequest-r16-IEs,
         criticalExtensionsFuture              SEQUENCE { }
      }
   }
}
RRCSystemInfoRequest-IEs ::=  SEQUENCE {
   requested-SI-List       BIT STRING (SIZE (maxSI-Message)),  --32bits
   spare                   BIT STRING (SIZE (12))
}
RRC-PosSystemInfoRequest-r16-IEs ::=  SEQUENCE {
   requestedPosSI-ListBIT STRING (SIZE (maxSI-Message)),       --32bits
   spare                   BIT STRING (SIZE (11))
}
```

According to certain embodiments, appropriate bits in the RRCSystemInfoRequest-IEs field of the request message RRCSystemInfoRequest are used by a UE 102 to request information about NPN services for an available NPN to which the UE is not already subscribed. In response, depending on the particular implementation, the RAN 104 uses either a modified SIB-10 response message SIB10-r16 or a new SIB response message NEW-SIB-r18 to transmit the requested NPN service information back to the UE 102.

Modified SIB-10 Response Message

The existing SIB-10 response message provides Human Readable Network Names (HRNNs) for NPNs. According to certain embodiments, the SIB-10 downlink message SIB10-r16 is modified to include an NPN-service octet-string field NPN-Serv that can be used to incorporate human-readable information regarding the services offered by a given NPN. The modified SIB-10 message SIB10-r16 is defined as follows:

```
SIB10-r16 ::=               SEQUENCE {
   hrnn-List-r16              HRNN-List-r16           OPTIONAL, -- Need R
   lateNonCriticalExtension   OCTET STRING            OPTIONAL,
   ...
}
HRNN-List-r16 ::=           SEQUENCE (SIZE (1..maxNPN-r16)) OF HRNN-r16
HRNN-r16 ::=                SEQUENCE {
   hrnn-r16 OCTET STRING (SIZE(1.. maxHRNN-Len-r16)) OPTIONAL -- Need R
   NPN-Serv OCTET STRING (SIZE(1.. maxNPN-Serv-Len-r18)) OPTIONAL -- Need R
}
```

As described further below, by setting appropriate indicators in the SIB-1 message, the new SIB response message can be cell- or area-specific, thereby minimizing overhead for the wider network. The periodicity of the new SIB response message is proposed to be aligned with similar SIB messages. The first exchange of information regarding NPN services is initiated by the UE as described before with the SystemInfo request message. To minimize the load on the network because of similar requests from different UEs (e.g., in a stadium use case), the network may advertise these messages through the gNBs in a given area at regular intervals.

The same number of HRNN elements as the number of NPNs in SIB-1 are included in the modified SIB-10 message, where the nth entry of HRNN-List contains the human-readable network name of the nth NPN of SIB-1. The human-readable network name in the corresponding entry in HRNN-List is absent if there is no HRNN associated with the given NPN. The new NPN-Serv field provides human-readable descriptions of the services offered by the corresponding NPN.

New SIB Response Message

For the new SIB response message NEW-SIB-r18, the SystemInformation-IEs for the SIB-1 message SystemInformation may be modified as follows:

```
SystemInformation-IEs ::=    SEQUENCE {
    sib-TypeAndInfo          SEQUENCE (SIZE (1..maxSIB)) OF CHOICE {
        sib2                 SIB2,
        sib3                 SIB3,
        sib4                 SIB4,
        sib5                 SIB5,
        sib6                 SIB6,
        sib7                 SIB7,
        sib8                 SIB8,
        sib9                 SIB9,
        ...,
        sib10-v1610          SIB10-r16,
        sib11-v1610          SIB11-r16,
        sib12-v1610          SIB12-r16,
        sib13-v1610          SIB13-r16,
        sib14-v1610          SIB14-r16,
        new-sib-v18-10       NEW-SIB-r18
    },
    lateNonCriticalExtension    OCTET STRING     OPTIONAL,
    nonCriticalExtension        SEQUENCE { }     OPTIONAL
}
```

According to one possible implementation, the new SIB response message NEW-SIB-r18 may be defined with a bit-string field NPNServicesSupported as follows:

```
NEW-SIB-r18 ::=  SEQUENCE {
    npn-service-List-r18         NPN-Sevice-List-r18
}
NPN-Service-List-r18 ::= SEQUENCE (SIZE (1..maxNPN-r18)) OF NPN-Serv-r18
NPN-Serv-r18 ::=                 SEQUENCE {
    messageIdentifier   BIT STRING (SIZE (16)),
    serialNumber                 BIT STRING (SIZE (16)),
    NPNServicesSupported BIT STRING (SIZE (32)),
    ServiceMessageSegmentType ENUMERATED {notLastSegment, lastSegment},
    ServiceMessageSegmentNumber   INTEGER (0..63),
    ServiceMessageSegment   OCTET STRING,
    dataCodingScheme OCTET STRING (SIZE (1)) OPTIONAL, -- Cond Segment1
...
...
}
``` the SIB. A segment number of zero corresponds to the first segment, a segment number of one corresponds to the second segment, and so on.

Note: The supported NPN services can be indicated either in one attribute (using NPNServicesSupported) as a bit string or in one or more segments (using ServiceMessageSegmentType, ServiceMessageSegmentNumber, ServiceMessageSegment, and dataCodingScheme) if so desired to provide more information (possibly in human-readable clear-text format if required).

The fields of this implementation of the NEW-SIB-18 message are defined as follows:

messageIdentifier: Identifies the source and type of service offering notification to indicate that the message is sent from a particular "service provider."

serialNumber: Identifies variations of a service offering notification to tell the UE whether the previous received message has been updated or not. The UE updates the information to the user only when messageIdentifier and/or serialNumber is modified.

NPNServicesSupported: Description of services offered by the NPN as encoded in different binary and/or hex values, similar to the previous discussion of encoding in the context of the broadcasted information about NPN services.

ServiceMessageSegmentType: Indicates whether the included service offering warning message segment is the last segment or not.

ServiceMessageSegmentNumber Segment number of the service offering warning message segment contained in ServiceMessageSegment: Carries a segment of the service offering Message Contents IE.

dataCodingScheme: Identifies the alphabet/coding and the language-applied variations of a service offering notification.

Segment1: The field is mandatory present in the first segment of New-SIB; otherwise, it is absent.

When the service information for an NPN is large, the fields ServiceMessageSegmentType, ServiceMessageSegmentNumber, ServiceMessageSegment, and dataCodingScheme can be used to implement a segmentation approach in which the information is sequentially conveyed via different instances of the NEW-SIB-r18 message.

According to another possible implementation, the new SIB response message NEW-SIB-r18 is defined as above, except that the NPNServicesSupported field is an octet string defined as follows:

NPNServicesSupported OCTET STRING (SIZE(1 . . . maxNPNServ-Len-r18))

In this implementation, different establishment types and/or different NPN services can be described using a human-readable clear-text format. This enables new service offerings or service changes to be incorporated without having any changes in UE or network functions. This information may be provided in one or more segments as needed, and may support different encoding options.

New features may not be available in older versions, but the system as a whole shall be backwards compatible with existing network functions. Furthermore, certain embodiments involve only software modifications, such that no changes to hardware are needed.

In certain embodiments, the present disclosure is a radio access network for a wireless communication network, wherein the RAN comprises a wireless transceiver, a backhaul transceiver, and a processor configured to control the operations of the wireless and backhaul transceivers. The wireless transceiver is configured to transmit, to user equipment, information about NPN services provided by a non-public network supported by the wireless communication network; the wireless transceiver is configured to receive an on-boarding request from the UE to on-board the UE to the NPN; the backhaul transceiver is configured to forward the on-boarding request to an on-boarding network of the wireless communication network; the backhaul transceiver is configured to receive NPN credentials for the UE from the OBN; and the wireless transceiver is configured to forward the NPN credentials to the UE.

In at least some of the above embodiments, the wireless transceiver is configured to transmit the information about the NPN services to the UE in broadcasted messages.

In at least some of the above embodiments, the wireless communications network is a 5G network; the NPN is a Standalone Non-Public Network having an SNPN Identifier having a Network Identifier portion; and the processor is configured to encode the information about the NPN services in the NID portion of the SNPN-ID in the broadcasted messages.

In at least some of the above embodiments, the Network Identifier has an Assignment Mode value and a NID value; and in order to transmit the NPN information, the processor is configured to assign a value to the Assignment Mode value that indicates that the NID value encodes the information about the NPN services.

In at least some of the above embodiments, the wireless transceiver is configured to transmit the information about the NPN services to the UE in response to receiving from the UE a request for the information.

In at least some of the above embodiments, the wireless communications network is a 5G network; and the wireless transceiver is configured to receive the request for the NPN services information by setting appropriate bits as needed for SIB-10 or a new SIB in the RRCSystemInfoRequest-IEs field of the request message RRCSystemInfoRequest.

In at least some of the above embodiments, the wireless transceiver is configured to transmit the NPN services information as a bit string to be decoded by the UE.

In at least some of the above embodiments, the wireless transceiver is configured to transmit the NPN services information in a human-readable clear-text format.

In at least some of the above embodiments, the wireless communications network is a 5G network; and the wireless transceiver is configured to transmit the information in one or more fields in a modified SIB-10 message.

In at least some of the above embodiments, the wireless communications network is a 5G network; and the wireless transceiver is configured to transmit the information in one or more fields a new SIB message as one or more segments.

In certain other embodiments, the present disclosure is user equipment for a wireless communication network having a radio access network, wherein the UE comprises a wireless transceiver and a processor. The wireless transceiver is configured to receive, from the RAN, information about NPN services provided by a nonpublic network supported by the wireless communication network; the wireless transceiver is configured to transmit an on-boarding request to the RAN to on-board the UE to the NPN; the wireless transceiver is configured to receive NPN credentials for the UE from the RAN; and the processor is configured to register to the NPN.

In at least some of the above embodiments, the wireless transceiver is configured receive the information about the NPN services in broadcasted messages from the RAN.

In at least some of the above embodiments, the wireless communications network is a 5G network; the NPN is a Standalone Non-Public Network having an SNPN Identifier having a Network Identifier portion; the wireless transceiver is configured to receive the information about the NPN services encoded in the NID portion of the SNPN-ID in the broadcasted messages; and the processor is configured to decode the information about the NPN services.

In at least some of the above embodiments, the ND portion has an Assignment Mode value and a NID value; and, in order to receive the NPN information, the processor is configured to detect a value for the Assignment Mode value that indicates that the ND value encodes the information about the NPN services.

In at least some of the above embodiments, the wireless transceiver is configured to transmit a request for the information about the NPN services to the RAN.

In at least some of the above embodiments, the wireless communications network is a 5G network; and the wireless transceiver is configured to transmit the request for the NPN services information by setting appropriate bits as needed for SIB-10 or a new SIB in the RRCSystemInfoRequest-IEs field of the request message RRCSystemInfoRequest.

In at least some of the above embodiments, the wireless transceiver is configured to receive the NPN services information as a bit string to be decoded by the UE.

In at least some of the above embodiments, the wireless transceiver s configured to receive the NPN services information in a human-readable clear-text format.

In at least some of the above embodiments, the wireless communications network is a 5G network; and the wireless transceiver is configured to receive the information in a field in a modified SIB-10 message.

In at least some of the above embodiments, the wireless communications network is a 5G network; and the wireless transceiver is configured to receive the information in a field in a new SIB message.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A radio access network (RAN) for a wireless communication network, wherein the RAN comprises a wireless transceiver, a backhaul transceiver, and a processor configured to control the operations of the wireless and backhaul transceivers, wherein:
   the wireless transceiver is configured to transmit, to user equipment (UE), information about NPN services provided by a non-public network (NPN) supported by the wireless communication network;
   the wireless transceiver is configured to receive an on-boarding request from the UE to on-board the UE to the NPN;
   the backhaul transceiver is configured to forward the on-boarding request to an on-boarding network (OBN) of the wireless communication network;
   the backhaul transceiver is configured to receive NPN credentials for the UE from the OBN; and
   the wireless transceiver is configured to forward the NPN credentials to the UE.

2. The RAN of claim 1, wherein the wireless transceiver is configured to transmit the information about the NPN services to the UE in broadcasted messages.

3. The RAN of claim 2, wherein:
   the wireless communications network is a 5G network;
   the NPN is a Standalone Non-Public Network (SNPN) having an SNPN Identifier (SNPN-ID) having a Network Identifier (NID) portion; and
   the processor is configured to encode the information about the NPN services in the NID portion of the SNPN-ID in the broadcasted messages.

4. The RAN of claim 3, wherein:
   the Network Identifier has an Assignment Mode value and a NID value; and
   in order to transmit the NPN information, the processor is configured to assign a value to the Assignment Mode value that indicates that the NID value encodes the information about the NPN services.

5. The RAN of claim 1, wherein the wireless transceiver is configured to transmit the information about the NPN services to the UE in response to receiving from the UE a request for the information.

6. The RAN of claim 5, wherein:
   the wireless communications network is a 5G network; and
   the wireless transceiver is configured to receive the request for the NPN services information by setting appropriate bits as needed for SIB-10 or a new SIB in the RRCSystemInfoRequest-IEs field of the request message RRCSystemInfoRequest.

7. The RAN of claim 5, wherein the wireless transceiver is configured to transmit the NPN services information as a bit string to be decoded by the UE.

8. The RAN of claim 7, wherein the wireless transceiver is configured to transmit the NPN services information in a human-readable clear-text format.

9. The RAN of claim 5, wherein:
   the wireless communications network is a 5G network; and
   the wireless transceiver is configured to transmit the information in one or more fields in a modified SIB-10 message.

10. The RAN of claim 5, wherein:
    the wireless communications network is a 5G network; and
    the wireless transceiver is configured to transmit the information in one or more fields a new SIB message as one or more segments.

11. A method for a radio access network (RAN) for a wireless communication network, wherein the RAN comprises a wireless transceiver, a backhaul transceiver, and a processor that controls the operations of the wireless and backhaul transceivers, the method comprising:
    the wireless transceiver transmitting, to user equipment (UE), information about NPN services provided by a non-public network (NPN) supported by the wireless communication network;
    the wireless transceiver receiving an on-boarding request from the UE to on-board the UE to the NPN;
    the backhaul transceiver forwarding the on-boarding request to an on-boarding network (OBN) of the wireless communication network;
    the backhaul transceiver receiving NPN credentials for the UE from the OBN; and
    the wireless transceiver forwarding the NPN credentials to the UE.

12. User equipment (UE) for a wireless communication network having a radio access network (RAN), wherein the UE comprises a wireless transceiver and a processor, wherein:
    the wireless transceiver is configured to transmit, to the RAN, a request for information about NPN services provided by a non-public network (NPN) supported by the wireless communication network;
    the wireless transceiver is configured to receive, from the RAN, the information about the NPN services;
    the wireless transceiver is configured to transmit an on-boarding request to the RAN to on-board the UE to the NPN;
    the wireless transceiver is configured to receive NPN credentials for the UE from the RAN; and
    the processor is configured to register to the NPN.

13. The UE of claim 12, wherein the wireless transceiver is configured receive the information about the NPN services in broadcasted messages from the RAN.

14. The UE of claim 13, wherein:
    the wireless communications network is a 5G network;
    the NPN is a Standalone Non-Public Network (SNPN) having an SNPN Identifier (SNPN-ID) having a Network Identifier (NID) portion;
    the wireless transceiver is configured to receive the information about the NPN services encoded in the NID portion of the SNPN-ID in the broadcasted messages; and
    the processor is configured to decode the information about the NPN services.

15. The UE of claim 14, wherein:
    the NID portion has an Assignment Mode value and a NID value; and
    in order to receive the NPN information, the processor is configured to detect a value for the Assignment Mode value that indicates that the NID value encodes the information about the NPN services.

16. The UE of claim 12, wherein:
the wireless communications network is a 5G network; and
the wireless transceiver is configured to transmit the request for the NPN services information by setting appropriate bits as needed for SIB-10 or a new SIB in the RRCSystemInfoRequest-IEs field of the request message RRCSystemInfoRequest.

17. The UE of claim 12, wherein the wireless transceiver is configured to receive the NPN services information as a bit string to be decoded by the UE.

18. The UE of claim 12, wherein the wireless transceiver is configured to receive the NPN services information in a human-readable clear-text format.

19. The UE of claim 12, wherein:
the wireless communications network is a 5G network; and
the wireless transceiver is configured to receive the information in a field in a modified SIB-10 message.

20. The UE of claim 12, wherein:
the wireless communications network is a 5G network; and
the wireless transceiver is configured to receive the information in a field in a new SIB message.

21. A method for user equipment (UE) for a wireless communication network having a radio access network (RAN), wherein the UE comprises a wireless transceiver and a processor, the method comprising:
the wireless transceiver transmitting, to the RAN, a request for information about NPN services provided by a non-public network (NPN) supported by the wireless communication network;
the wireless transceiver receiving, from the RAN, the information about the NPN services;
the wireless transceiver transmitting an on-boarding request to the RAN to on-board the UE to the NPN;
the wireless transceiver receiving NPN credentials for the UE from the RAN; and
the processor registering to the NPN.

22. User equipment (UE) for a wireless communication network having a radio access network (RAN), wherein the UE comprises a wireless transceiver and a processor, wherein:
the wireless transceiver is configured to receive, from the RAN, information about NPN services provided by a non-public network (NPN) supported by the wireless communication network in broadcasted messages from the RAN;
the wireless transceiver is configured to transmit an on-boarding request to the RAN to on-board the UE to the NPN;
the wireless transceiver is configured to receive NPN credentials for the UE from the RAN; and
the processor is configured to register to the NPN.

23. The UE of claim 22, wherein:
the wireless communications network is a 5G network;
the NPN is a Standalone Non-Public Network (SNPN) having an SNPN Identifier (SNPN-ID) having a Network Identifier (NID) portion;
the wireless transceiver is configured to receive the information about the NPN services encoded in the NID portion of the SNPN-ID in the broadcasted messages; and
the processor is configured to decode the information about the NPN services.

24. The UE of claim 23, wherein:
the NID portion has an Assignment Mode value and a NID value; and
in order to receive the NPN information, the processor is configured to detect a value for the Assignment Mode value that indicates that the NID value encodes the information about the NPN services.

25. A method for user equipment (UE) for a wireless communication network having a radio access network (RAN), wherein the UE comprises a wireless transceiver and a processor, the method comprising:
the wireless transceiver receiving, from the RAN, information about NPN services provided by a non-public network (NPN) supported by the wireless communication network in broadcasted messages from the RAN;
the wireless transceiver transmitting an on-boarding request to the RAN to on-board the UE to the NPN;
the wireless transceiver receiving NPN credentials for the UE from the RAN; and
the processor registering to the NPN.

26. The method of claim 25, wherein:
the wireless communications network is a 5G network;
the NPN is a Standalone Non-Public Network (SNPN) having an SNPN Identifier (SNPN-ID) having a Network Identifier (NID) portion;
the wireless transceiver receives the information about the NPN services encoded in the NID portion of the SNPN-ID in the broadcasted messages; and
the processor decodes the information about the NPN services.

27. The method of claim 26, wherein:
the NID portion has an Assignment Mode value and a NID value; and
in order to receive the NPN information, the processor detects a value for the Assignment Mode value that indicates that the NID value encodes the information about the NPN services.

* * * * *